(12) United States Patent
Alyassin et al.

(10) Patent No.: US 6,463,168 B1
(45) Date of Patent: *Oct. 8, 2002

(54) APPARATUS AND METHOD FOR RAPID CONNECTIVITY PROCESSING OF IMAGES

(75) Inventors: Abdalmajeid Musa Alyassin, Albany, NY (US); Gopal Biligeri Avanash, New Berlin, WI (US); William Edward Lorensen, Ballston Lake, NY (US)

(73) Assignee: General Electric Company, Niskyuna, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,302

(22) Filed: Dec. 4, 1998

(51) Int. Cl.[7] .................................................. G06K 9/00
(52) U.S. Cl. ...................... 382/131; 382/128; 250/201.2
(58) Field of Search ................................ 382/131, 267, 382/204, 132, 128; 345/25; 364/414; 250/252.1, 201.2; 435/35

(56) References Cited

U.S. PATENT DOCUMENTS

| | | | | |
|---|---|---|---|---|
| 4,751,643 A | * | 6/1988 | Lorensen et al. ............ 364/414 |
| 4,903,202 A | * | 2/1990 | Crawford ..................... 364/413 |
| 4,905,148 A | * | 2/1990 | Crawford ..................... 364/413 |
| 4,985,834 A | * | 1/1991 | Cline et al. .................. 364/413 |
| 5,150,427 A | * | 9/1992 | Frazee et al. .................. 382/48 |
| 5,204,625 A | * | 4/1993 | Cline et al. .................. 324/306 |
| 5,857,030 A | * | 1/1999 | Gaborski et al. ............ 382/132 |
| 5,940,089 A | * | 8/1999 | Dilliplane et al. .......... 345/515 |
| 6,173,077 B1 | * | 1/2001 | Trew et al. .................. 382/236 |

* cited by examiner

Primary Examiner—Leo Boudreau
Assistant Examiner—Barry Choobin
(74) Attorney, Agent, or Firm—Jean K. Testa; Jill M. Breedlove

(57) ABSTRACT

A mechanism for improving connectivity processing of computer axial tomography and magnetic resonance images by a fast, stack independent, iterative method first designates a pixel of an object material of interest in an image as a seed pixel. The mechanism then performs connectivity processing by starting at the seed pixel and evaluating the next forward direct neighbor pixel to determine if it is within the object material of interest. If the direct neighbor pixel is within the object, the direct neighbor pixel is marked as a new seed pixel and the connectivity mechanism evaluates the next forward direct neighbor pixel, continuing in a left-to-right and top-to-bottom fashion. Once forward processing of all pixels is complete, and if at least one pixel has been identified as a new seed pixel, the connectivity mechanism evaluates, in a backward progression, unevaluated pixel within the image, beginning at the lower right-most pixel in the image and proceeding through the pixels in a right-to-left, bottom-to-top fashion.

11 Claims, 8 Drawing Sheets

APPARATUS AND METHOD FOR RAPID CONNECTIVITY PROCESSING OF IMAGES

BACKGROUND OF THE INVENTION

This invention relates to processing tomographic images such as computed tomography (CT) images or magnetic resonance imaging (MRI) images, and more specifically to preparing these images for visualization.

The discovery of the x-ray in 1895 can be considered the beginning of the era of meaningful non-invasive study of the human body. The subsequent developments of computed tomography (CT) and magnetic resonance (MR) imaging technologies have allowed doctors and scientists to gain valuable insight into the workings of the human body. The development and use of the x-ray and related technologies has led to earlier diagnosis of various illnesses and diseases, enabling doctors to save the lives of many patients. Although the x-ray has proven very valuable, there are certain limitations inherent in the technology that have not yet been addressed.

For example, the x-ray is unable to clearly distinguish and differentiate between various organs of the body such as the kidney, liver and pancreas. This technological limitation stems from the fact that the water densities of organs are all very similar, and that the x-ray cannot clearly distinguish between internal organs with similar water densities. In addition, an x-ray image may contain overlapping images of bone and organ and since bones have a greater density than organs, the portion of the x-ray image containing the bone totally obscures the image of any abnormalities located within an organ which it overlaps.

During a CT imaging session, a patient lies horizontal and is exposed to a series of X-ray detectors. A beam of x-rays passes a particular thin cross-section or "slice" of the patient. The detectors measure the amount of transmitted radiation and then calculate x-ray absorption of every point within the slice. A grayscale image is then constructed based upon the calculated x-ray absorption. The shades of gray in the image contrast the amount of x-ray absorption of every point within the slice. The slices obtained during a CT session can be reconstructed to provide an anatomically correct representation of the area of interest within the body that has been exposed to the x-rays.

During an MR imaging session, the patient is placed inside a strong magnetic field generated by a large magnet. Magnetized protons within the patient, such as hydrogen atoms, align with the magnetic field produced by the magnet. A particular slice of the patient is exposed to radio waves which create an oscillating magnetic field perpendicular to the main magnetic field. The slices can be taken in any plane chosen by the physician or technician (hereinafter the "operator") performing the imaging session. The protons in the patient's body first absorb the radio waves and then emit the waves by moving out of alignment with the field. As the protons return to their orignal state (before excitation), diagnostic images based upon the waves emitted by the patient's body are created. Like CT image slices, MR image slices can be reconstructed to provide an overall picture of the body area of interest. Parts of the body that produce a high signal are displayed as white in an MR image, while those with the lowest signals are displayed as black. Other body parts that have varying signal intensities between high and low are displayed as some shade of gray.

Regardless of the technology used to generate the initial slices, once the slices have been generated, they must be reassembled into complete images for viewing. Most imaging machines available today allow the operator to select the specific area of an image that they wish to view. For example, the operator may only wish to view bone in an image and to eliminate all other body materials, such as tissue. Once the user designates the area of the image or the body material of interest, a procedure known as "connectivity" reassembles all instances of the designated body material occurring throughout the various slices. Connectivity as used herein refers to the process of connecting points (pixels or voxels) belonging to the same object.

At least three different methods have previously been used to perform connectivity processing. One method uses dilation to perform connectivity. The dilation method has two data sets, an original data set and a "seed" data set. A seed is a particular point chosen by the user that is within a particular body material of interest. The original data set contains an image with an area of interest represented as a "1" and the other areas of the image represented as a "0." The dilation process starts when a seed from the seed data set is dilated, that is, each neighboring seed is checked to determine whether it is within the object. All neighbors of the seed are then stored into the original data set as seeds. The dilation method is repeated until no other seeds are added to the original data set. While the dilation method effectively performs connectivity, it is very slow.

A recursive-based implementation has also been used to perform connectivity processing. The recursive-based implementation starts with a seed voxel on a surface selected by the user. A voxel is simply a unit of graphic information that defines a point in three dimensional space. A voxel has 26 neighboring voxels throughout the x, y, and z coordinate planes. Once the seed is identified, the recursive based implementation collects all neighboring surface voxels and marks or designates these neighboring voxels as seeds for the next level of recursion. After all neighboring voxels have been collected, the recursive technique calls itself again providing the neighboring voxels as parameters. The recursive technique continues until all connected voxels are marked and the image can be assembled.

While the recursive technique performs connectivity very quickly, the technique also has several disadvantages. For example, the recursive technique raises the issue of memory size and usage. As the recursive connectivity technique marks the neighboring voxels and the recursive procedure continues to call itself, the number of elements tracked by the imaging system grows proportionately. When there are a large number of voxels in an image, the probability that the stack in the computer's memory will overflow greatly increases. When a stack overflow occurs, no more elements can be added to the stack and the recursive procedure halts. This means that the recursive technique is not available for use on computer systems which have a limited stack.

Since the data sets produced by MR and CT images are typically very large in size, it is very likely the stack will overflow and that image processing will be aborted. In order to circumvent the likelihood of stack overflow and premature abortion of image processing, a method has been proposed whereby the size of the stack is repeatedly checked during the processing of an image. If the physical extent of the stack passes predetermined limits, processing can be halted. While this method may prevent inadvertent stack overflow if it is determined that the stack is too small to process a certain image, connectivity processing may still be aborted if the memory size is insufficient to connect all images slices.

Another method that can be used to perform connectivity processing is the iterative method. The iterative method is not quite as fast as the recursive method but it performs better than the dilation method and is stack size-independent, making it suitable for large images that cannot be processed using the recursive technique.

The current limitations of the present imaging technologies make it difficult to take full advantage of the full potential of MR and CT technologies. Without a more effective mechanism for performing connectivity and assembling slices into meaningful images, the field of medicine and other areas of scientific study and analysis that rely on MR and CT technologies will continue to be limited in the evaluation and use of currently available images.

BRIEF SUMMARY OF THE INVENTION

In accordance with preferred embodiments of the present invention, a connectivity mechanism for improving connectivity processing of computed tomography and magnetic resonance images is provided. Specifically, the connectivity mechanism provides a fast, stack-independent iterative method for performing connectivity processing. The connectivity mechanism first designates a pixel of an object in a two-dimensional image as a seed. The connectivity mechanism then performs connectivity processing by checking the next forward pixel to determine if the pixel is within the object and if a neighbor of the pixel is a seed. If the pixel is within the object and a neighbor of the pixel is a seed, the pixel is marked as a seed and the connectivity mechanism checks the next forward pixel.

Forward processing of pixels continues until all forward pixels within the object have been marked as seeds. Once a forward processing step is completed, and if at least one new seed pixel has been identified, the connectivity mechanism will perform a backward process step to search for additional pixels that should be marked as seeds. The backward processing step is similar in technique to the forward processing step but is performed in the opposite direction. The process continues with forward and backward marking steps until no additional seed pixels can be identified.

The foregoing and other features and advantages of the invention will be apparent from the following more particular description of the preferred embodiment of the invention, as illustrated in the accompanying drawings.

DETAILED DESCRIPTION OF THE INVENTION

Figure 1:
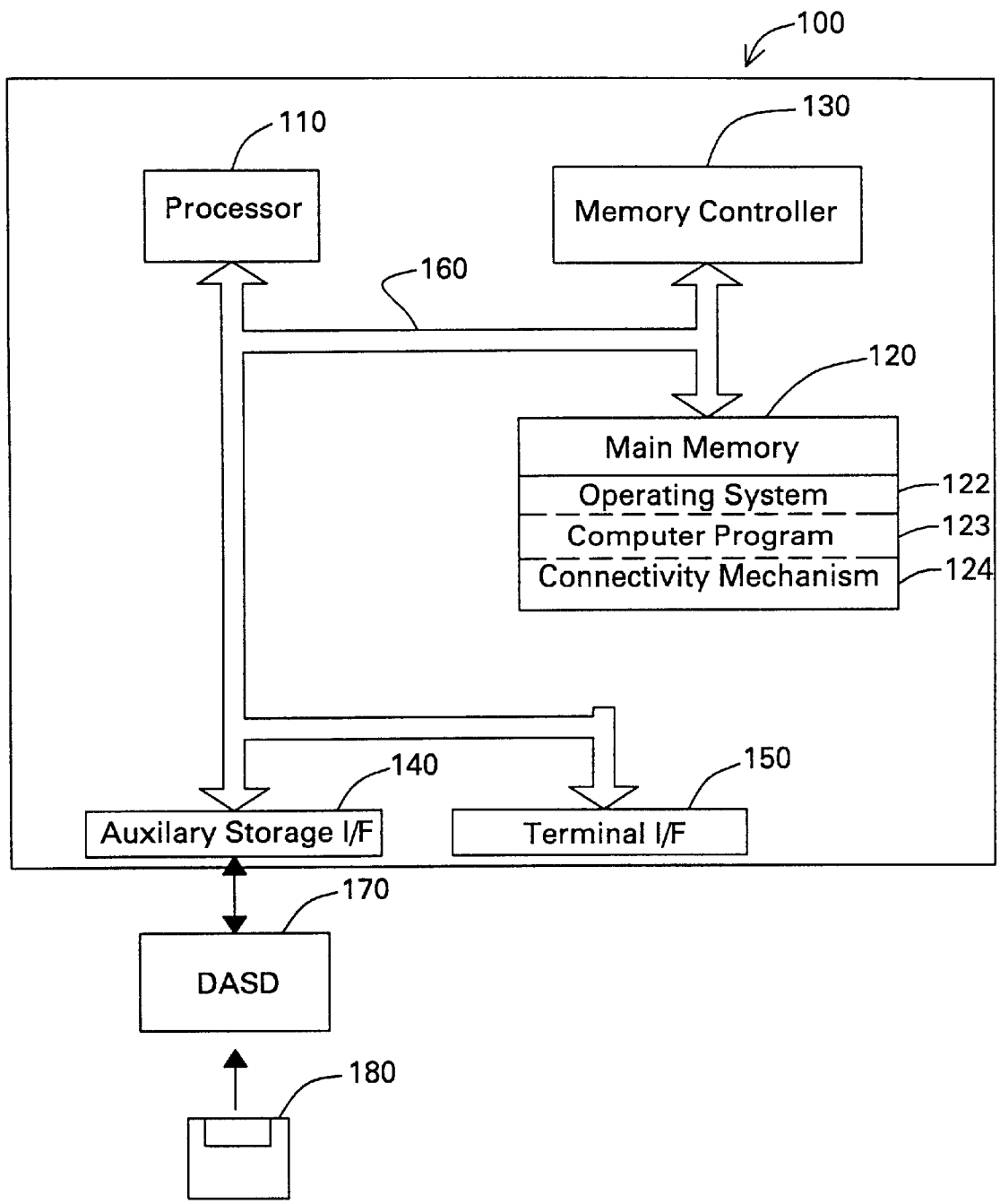
FIG. 1 is a block diagram of a computer system containing a connectivity mechanism in accordance with a preferred embodiment of the invention.

Since the invention is related to CT or magnetic resonance imaging, the overview section below presents some of the basic concepts necessary for understanding the invention. Those who are well versed in CT and magnetic resonance imaging may wish to proceed directly to the detailed description section.

1. OVER VIEW

Once initial MR or CT images have been obtained, the images are "segmented." Segmentation of CT and MR images allows surgeons to easily identify multiple tissue surfaces needed for surgical planning. The segmentation process classifies the pixels or voxels of an image into a certain number of classes that are homogeneous with respect to some characteristic (i.e. intensity, texture, etc.). For example, in a segmented image of the brain, the material of the brain can be categorized into three classes: gray matter, white matter, and cerebrospinal fluid. The segmented image will display the gray matter in a medium gray, the white matter in a white and the cerebrospinal fluid in a dark gray. Once the segmented image is developed, surgeons can use the segmented images to plan surgical techniques.

Creating a segmented CT or MR image involves several steps. A data set must first be created by capturing CT or MR slices of data. A grayscale value is then assigned to each point in the data set and different types of tissues will have different grayscale values. Each type of material in the data is assigned a specific value and, therefore, each occurrence of that material has the same grayscale value. For example, all occurrences of bone in a particular image may appear in a particular shade of light gray. This standard of coloring allows the individual viewing the image to easily understand the objects being represented in the images.

Frequently, noise (i.e., an unwanted signal or disturbance) distorts the data which can cause the MR or CT signal to be inconsistent with the overall image for certain points in the image. This noise may be a result of many different factors including machine error, operator error, the type of material being imaged, or even movement by the patient during exposure.

For example, one point in a data set may generate a signal indicating that the point contains bone, air and soft tissue. By performing data "thresholding" on the point, the correct value can be assigned to the point. Data thresholding involves determining the percentages of each element present at a particular data point. A range of signals is predefined for each element of the body such that each point in the data set falls within a range defined for a particular element. Thresholding is simply a process for differentiating between different structures, organs, or tissue type based on graphical values. The accuracy of the thresholding process depends on many factors, including the level of contrast between the structures, user or operator knowledge, the type of data being represented, etc.

After thresholding occurs, the operator of the CT or MR machine can designate the particular body material of interest in the image. For example, the operator may only wish to view bone in an image and to eliminate all other body materials, such as tissue. Once the operator designates the body material of interest, the image is broken up into ones and zeroes such that the body material of interest has the value of one and all other body material in the image has a value of zero. This process of characterizing the image is known as "binarizing" the data Once the image has been binarized, the procedure known as connectivity reassembles all instances of the designated body material occurring throughut the various slices. The connectivity process uses the ones and zeros assigned to points in the images to detect when the body material of interest exists in the image. All points with the value of one occurring throughout the various slices are then reconnected to form an anatomically correct representation of the complete body material.

2. DETAILED DESCRIPTION

FIG. 1 illustrates a computer system 100 in accordance with a preferred embodiment of the invention. This computer system is referred to as connectivity processing apparatus, and includes: a processor or Central Processing Unit (CPU) 110; a terminal interface 150; an auxiliary storage interface 140; a Direct Access Storage Device (DASD) 170 which may comprise a disk drive for a floppy disk 180; a bus 160; and a memory 120. In this example, memory 120 includes an operating system 122, a computer program 123, and a connectivity mechanism 124. Bus 160 is used to load computer program 123 and connectivity mechanism 124 into memory 120 for execution. Transfer of data into and out of memory 120 is controlled by a memory controller 130.

CPU 110 performs computation and control functions for connectivity processing apparatus 100 and may comprise a single integrated circuit, such as a microprocessor, or may comprise any suitable number of integrated circuit devices and/or circuit boards working in cooperation to accomplish the functions of a central processing unit. CPU 110 is capable of executing the programs contained in memory 120 and acting in response to those programs or other activities that may occur in connectivity processing apparatus 100.

Memory 120 may comprise any type of memory known to those skilled in the art. This includes Dynamic Random Access Memory (DRAM), Static RAM (SRAM), flash memory, cache memory, etc. While not explicitly shown in FIG. 1, memory 120 may be a single type of memory component or may be composed of many different types of memory components. In addition, memory 120 and CPU 110 may be distributed across several different computers that collectively comprise connectivity processing apparatus 100. For example, operating system 122 may reside on one computer with a CPU, computer program 123 may reside on another computer system with a separate CPU, and connectivity mechanism 124 may reside on a third computer system with yet a different CPU. Computer connectivity processing apparatus 100 of FIG. 1 simply illustrates many of the salient features of the invention, without limiting the physical location of CPU 110 or memory locations within memory 120.

Bus 160 serves to transmit programs, data, status and other forms of information or signals among the various components of connectivity processing apparatus 100 and may constitute any suitable physical or logical means of coupling computer systems and components known to those skilled in the art. This includes, but is not limited to, direct hard-wired connections, Internet connections, fiber optics, infrared (IR) and other forms of wireless connections.

Terminal interface 150 allows human users to communicate with connectivity processing apparatus 100. Auxiliary storage interface 140 represents any known form of interfacing a storage apparatus to a computer system and allows auxiliary storage devices such as DASD 170 to be coupled to, and communicate with, the other components of connectivity processing apparatus 100. While only one auxiliary storage interface 140 is shown, the invention anticipates multiple auxiliary storage interfaces and multiple auxiliary storage devices such as DASD 170. As shown in FIG. 1, DASD 170 may be a floppy disk drive that is capable of reading and writing programs or data on disk 180, although DASD 170 may alternatively comprise any other type of DASD such as CDROM drives, hard disk drives, optical drives, etc. Disk 180 represents the corresponding storage medium used with DASD 170, and, as such, disk 180 may comprise a typical 3.5 inch magnetic media disk, an optical disk, a magnetic tape or any other type of storage medium.

A preferred embodiment of the invention provides improved connectivity processing for magnetic resonance (MR) and computed axial tomography (CT) images. During an MR or CT session, a patient may be scanned at several different times from different perspectives to obtain thorough images of the subject matter. For example, when scanning the bones of the leg, one scan may show the lower bones of the leg, the fibula and the tibia. Another scan may show the knee portion of the leg, where the patella is located. Finally, a third scan may show the upper portion of the leg where the femur is located. Once all scans of the leg have been taken, the operator may wish to connect together all of the bones in the leg shown throughout the multiple scans. Connectivity processing can be used to connect the fibula and tibia from the first image to the patella in the second image and finally to connect the patella to the femur in the third image. Connectivity processing can be used to connect either tissue or bone throughout several scans.

All data gathered from multiple scans of the patient can be considered one data set. Each data set can be broken up into smaller units, either pixels or voxels. When the data set is two dimensional, the image is made up of units called pixels. A pixel is a point in two dimensional space that can be referenced using two dimensional coordinates, usually x and y. Each pixel in an image is surrounded by eight other pixels, the nine pixels forming a three-by-three square. These eight other pixels, which surround the center pixel, are considered the neighbors of the center pixel. For purposes of the present invention, only the four "direct" neighbors will be discussed. The direct neighbors are those four pixels which are directly north, south, east, and west of the pixel located in the center of a group of nine pixels. It is possible to implement the various embodiments of the present invention using all neighboring pixels, but this is not the most preferred embodiment.

When the data set is three dimensional, the image is displayed in units called voxels. A voxel is a point in three dimensional space that can be referenced using three dimensional coordinates, usually x, y and z. Each voxel is surrounded by twenty six other voxels. These twenty six voxels can be considered the neighbors of the original voxel.

Connectivity processing in accordance with a preferred embodiment of the present invention is implemented iteratively such that it is performed as fast as a recursive connectivity process but without the stack restraints already discussed. Specifically, the connectivity mechanism of the invention operates on a data set that has been broken down into two values. For example, all points of interest in the data set may be designated as the number one and all other points in the data set may be assigned the value of zero. Alternatively, all points of interest in the data set may have been labeled "new" and the other points in the data set designated as "old".

For purposes of providing an example, it is assumed that the pixels in the data set described herein have been separated into two groups and assigned a numeric value of either one or zero, where the numeric value of one represents the body material of interest and the numeric value of zero represents all other body material in the data set. The operator chooses the body material of interest and designates a seed in the material of interest. The connectivity mechanism assigns the value of two to the seed. Alternatively, it is possible to configure a connectivity mechanism that automatically selects a body of interest and automatically processes an image.

Figure 2:
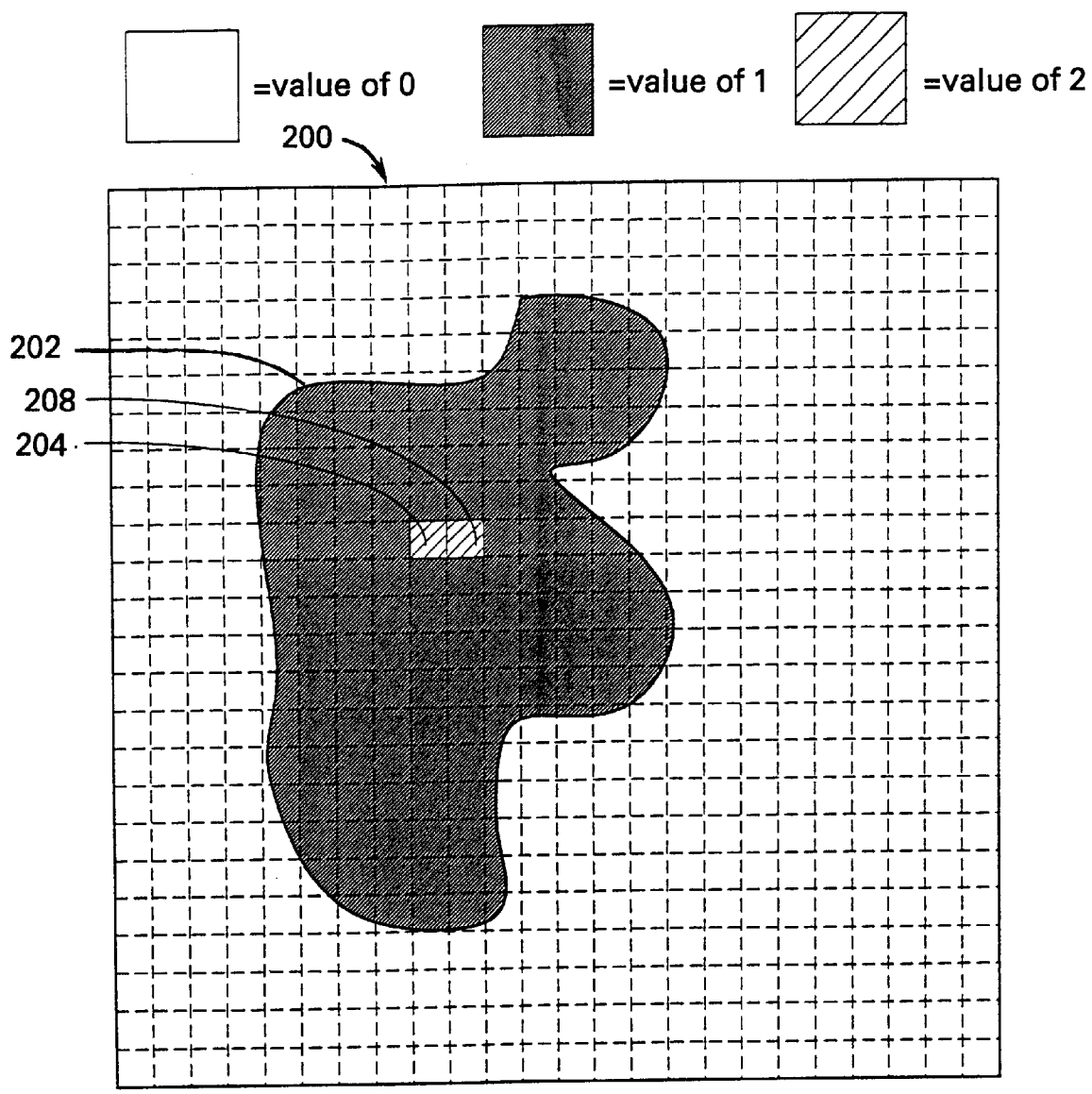
FIG. 2 depicts a set of topographic data where one pixel in an object has been designated as a seed in accordance with a preferred embodiment of the invention.

FIG. 2 shows a data set 200 that includes a body material of interest 202, and a seed 204 within body material 202. It can be assumed that data set 200 has been constructed based upon CT or MR signals generated during an imaging session and that body material 202 has been chosen by the operator to be the body material of interest. Data set 200 is made up of a plurality of pixels 206. As discussed above a pixel is a point in two dimensional space that can be referenced using an x, y coordinate. For simplicity, the present invention is described using a two dimensional data set; however the invention also applies to three dimensional data sets (in which case voxels would be used instead of pixels).

Each pixel 206 in data set 200 has been assigned a value of zero, one or two. In FIG. 2, all pixels 206 that contain body material 202 have an assigned value of one. As discussed above, although some pixels may be contained within the body material of interest, the value of such pixels may be zero due to thresholding. A first pixel within the body of interest is designated by the operator as a seed pixel 204 and is assigned the numeric value of two. Since a second pixel 208 is located within the body material of interest and has at least one neighboring pixel that is a seed pixel (pixel 204), when connectivity mechanism 124 (FIG. 1) evaluates pixel 208 during the first forward marking process step, it will consider pixel 208 as a new seed pixel and mark it accordingly by changing its numeric value from its first number (1) to a second number (2). All pixels 206 that do not contain body material 202 or that have not been designated as seeds 204 are shown in white and assigned the value zero.

A connectivity mechanism in accordance with the preferred embodiment uses a data pointer systematically and works its way through the entire data set representing the tomographic image to be processed to mark all pixels that belong to the body material sought to be displayed. The connectivity mechanism begins at the upper left-most pixel, which is at a first border region of the image, and moves through the image in a forward marking process step and evaluates each pixel contained within the image in a top-to-bottom, left-to-right fashion. Then, if any new pixels have been marked as additional seed pixels, the connectivity mechanism will begin at a second border region of the image diagonally opposite the first border region, here the lower right-most pixel in the image, and process all pixels contained within the image in a bottom-to-top, right-to-left fashion. As mentioned above, the user initially designates the body material of interest and the initial seed pixel within the body of interest. As the connectivity mechanism encounters a new pixel, the mechanism determines whether the new pixel is within the body material (has the value of one) and if the new pixel has a direct neighbor that is a seed (i.e., that a direct neighbor of the new pixel has a value of two). A direct neighbor of a new pixel is any neighboring pixel bordering on the new pixel.

As explained previously, in two dimensional data sets, a pixel is surrounded by a maximum of eight neighboring pixels. The connectivity mechanism checks the direct neighbors of the new pixel to determine if any have the value of two, denoting that the new pixel is a seed. If the new pixel is within the body material and the new pixel has a direct neighbor that is a seed, the connectivity mechanism marks the new pixel as a seed and proceeds to the next forward pixel in a forward scanning or forward marking process step. Forward scanning or forward marking of images means that the images are scanned from left to right and from top to bottom. Backward scanning or backward marking of images means the images are scanned from right to left and from bottom to top. Similar logic applies in the third dimension as well, if a three dimensional image is being processed. The connectivity mechanism will systematically perform a series of forward and backward marking process steps, as long as new seed pixels are being added during the process steps. Once no new seed pixels are added, the process ends.

Figure 3:
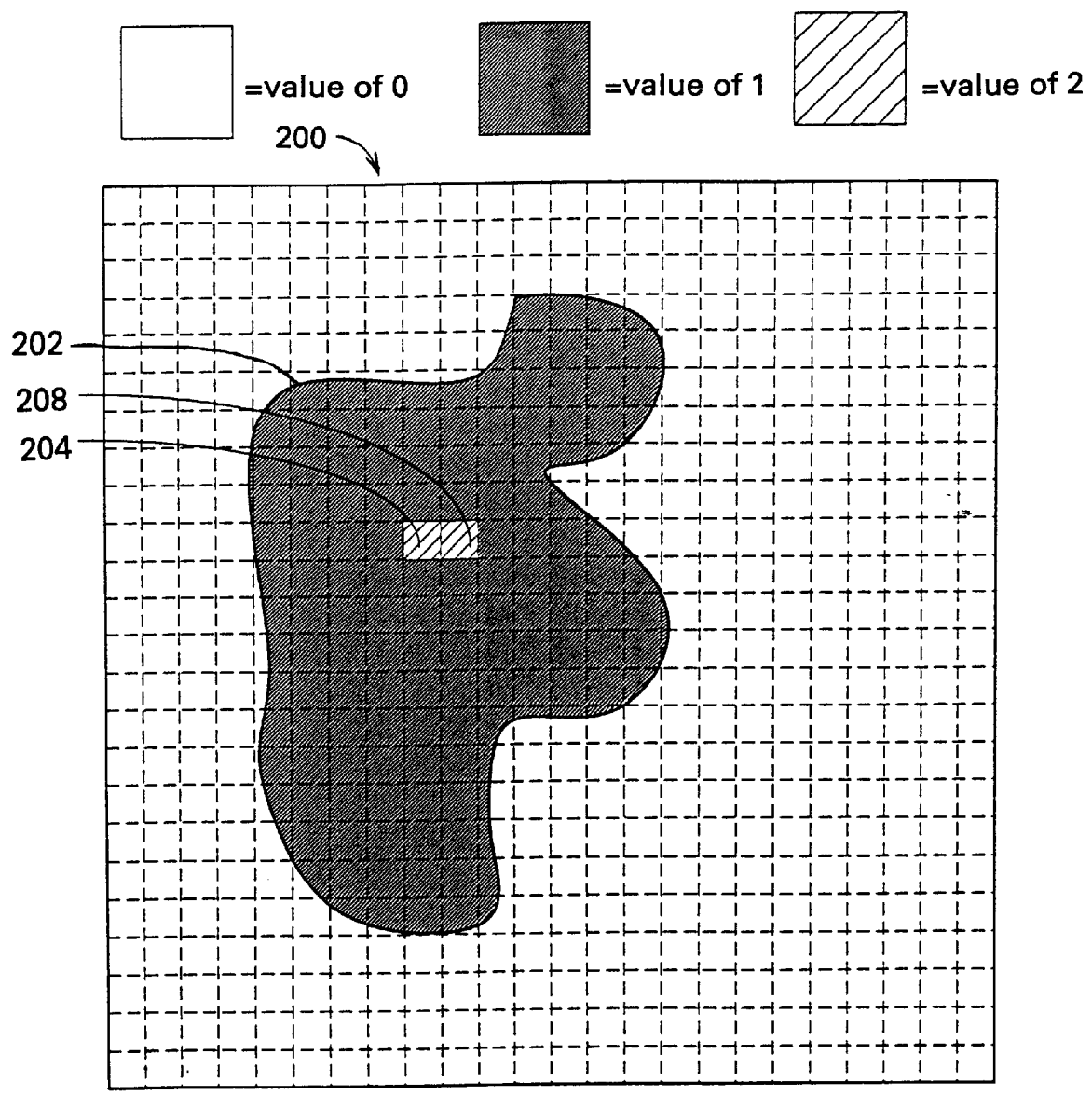
FIG. 3 depicts the topographic data of FIG. 2 wherein a forward filling technique in accordance with a preferred embodiment of the invention has begun based upon the seed of FIG. 2.

In FIG. 3, data set 200 of FIG. 2 is again shown; however, second pixel 208 in body material 202 has been marked as a seed and now has the value of two because the connectivity mechanism designated second pixel 208 for consideration in a forward marking process step and then determined that second pixel 208 was within body material 202 and had a direct neighbor that was a seed, i.e., seed 204. The connectivity mechanism then designated second pixel 208 as a seed pixel by assigning second pixel 208 the numeric value of two.

Figure 4:
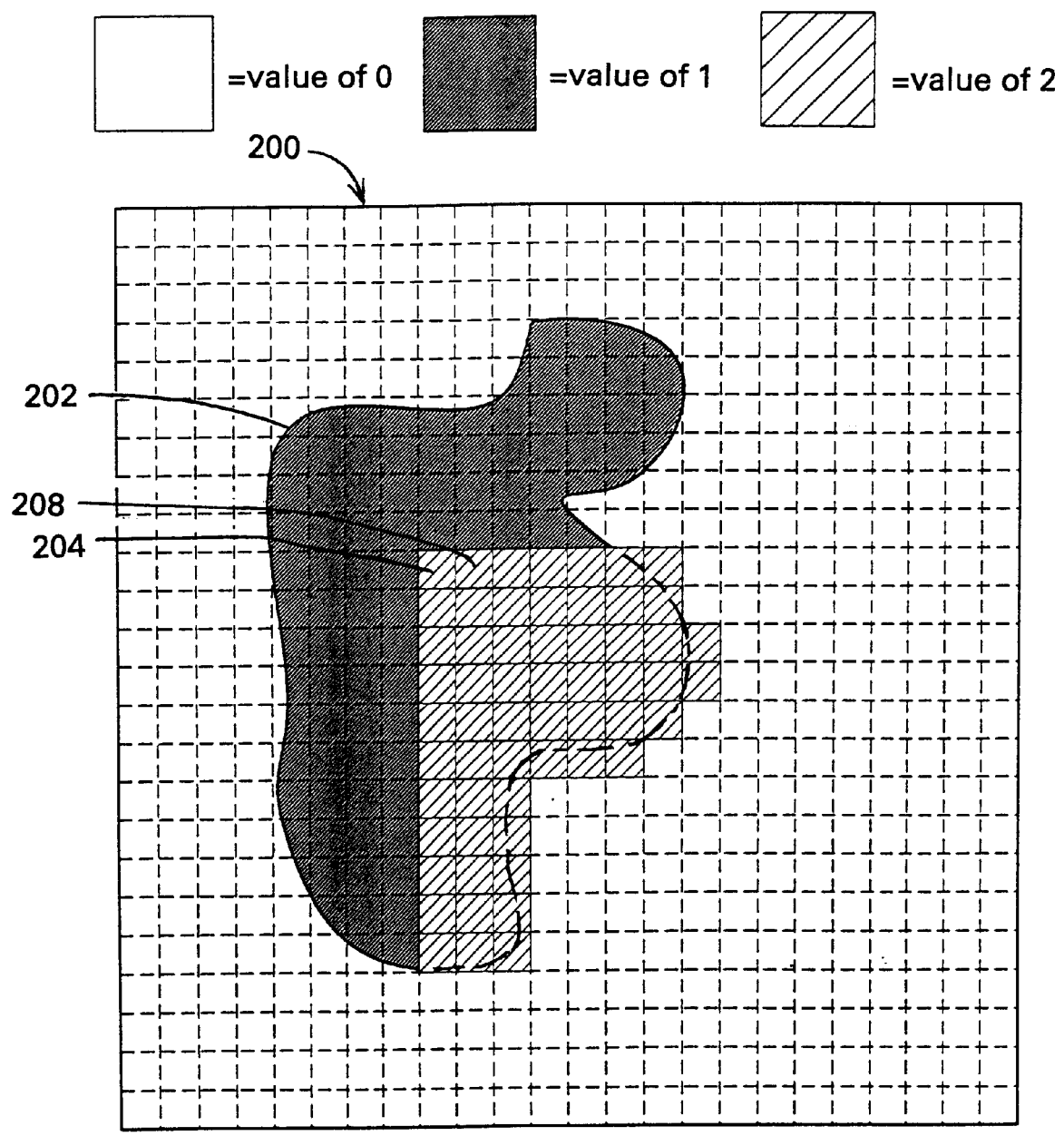
FIG. 4 depicts the topographic data of FIG. 3 after the forward filling process step of FIG. 3 has been completed.

After the connectivity mechanism changes a value of a pixel (from one to two), thereby designating it as a seed pixel, the connectivity mechanism continues to the next forward pixel in a forward marking process step or the next backward pixel in the case of a backward marking process step. As shown in FIG. 4, the connectivity mechanism continues to advance to the next forward pixel and to mark that pixel as a seed as long as such pixel is within the body material and has a neighbor that is a seed. FIG. 4 is a depiction of the body material after completion of the first forward marking process step, processing each of the pixels in the image. (For ease in understanding, the outline of body material 202 where the pixels have been marked as seed pixels is shown in phantom.) The marking of pixels as shown in FIG. 4 can be referred to as a forward marking process step.

Figure 5:
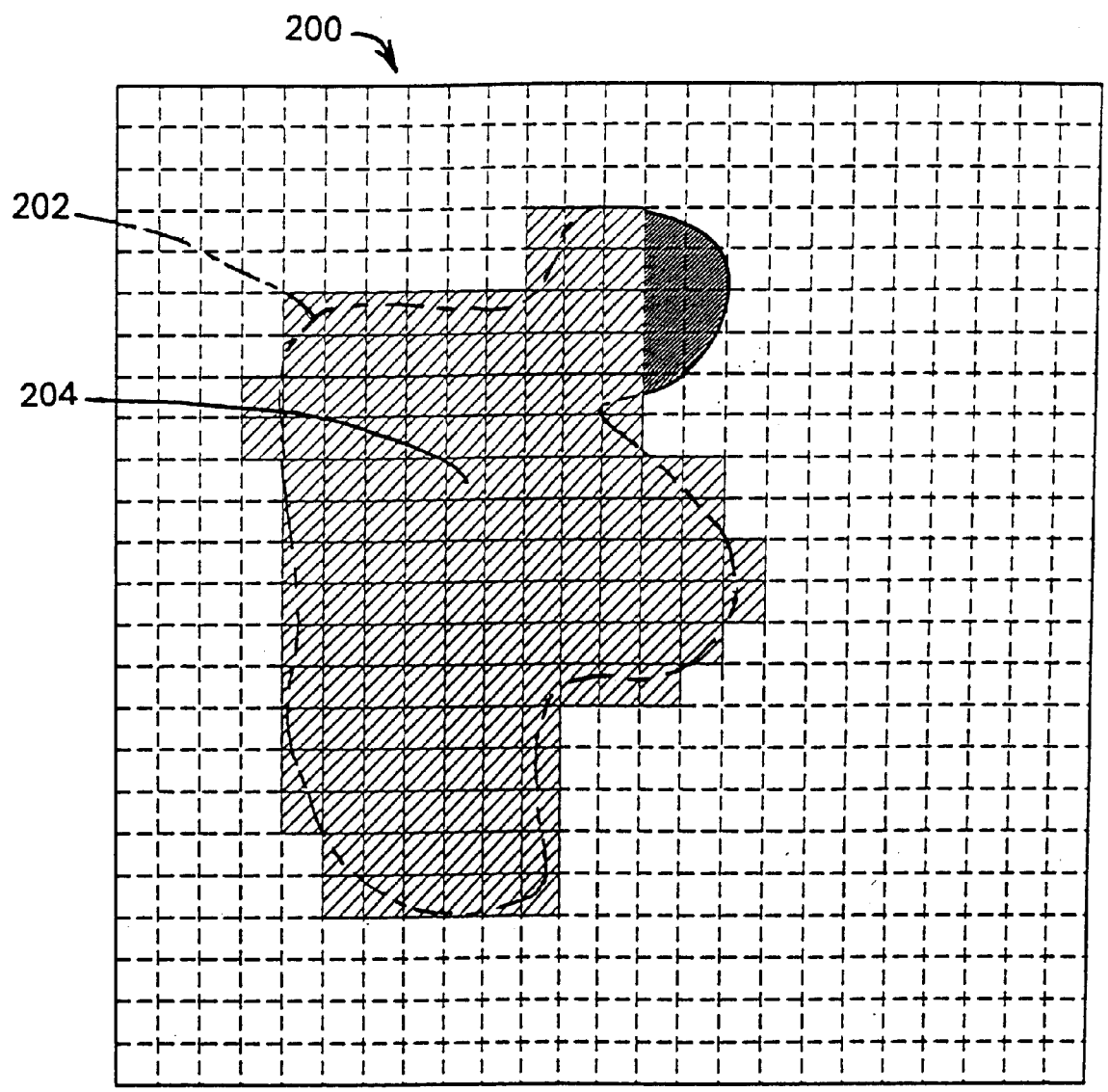
FIG. 5 depicts the topographic data of FIG. 4 after a backward filling process step in accordance with a preferred embodiment of the invention has been completed based upon the seed shown in FIG. 2.

When the connectivity mechanism has finished processing all forward pixels, and since several new seed pixels were identified during the forward marking process step, the connectivity mechanism starts to process all pixels in a backward marking step in a manner similar to that described above in reference to the forward marking step for the pixels. As shown in FIG. 5, connectivity mechanism 124 (FIG. 1) has processed the backward marking by evaluating pixels from right to left and from bottom to top, once again examining each pixel in the image to determine if it has a value of one (indicating it is in the body of interest) and to determine if a neighboring pixel is a seed (i.e., that a neighboring pixel has a value of two). If both of these conditions are met, then the pixel undergoing examination will be marked as a new seed pixel (i.e., the numeric value associated with the new seed pixel will be changed to a value of two) and the processing of the image continues with the next pixel. It can be seen from FIG. 5 that the marked pixels have become seed pixels with the value of two because connectivity mechanism 124 (FIG. 1) determined that those pixels were within body material 202 and had a neighbor that was a seed pixel. FIG. 5 is thus a depiction of the body material after completion of the first backward marking process step. It should be noted that, since a number of pixels have been identified and marked as seed pixels in the first backward marking process step, it will be necessary to complete another forward marking process step.

Figure 6:
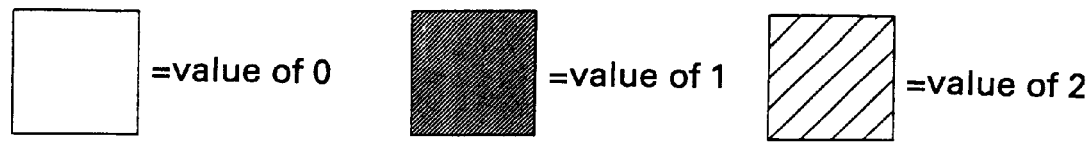
FIG. 6 depicts the topographic data of FIG. 5 after a second forward processing step has been completed.
Figure 6:
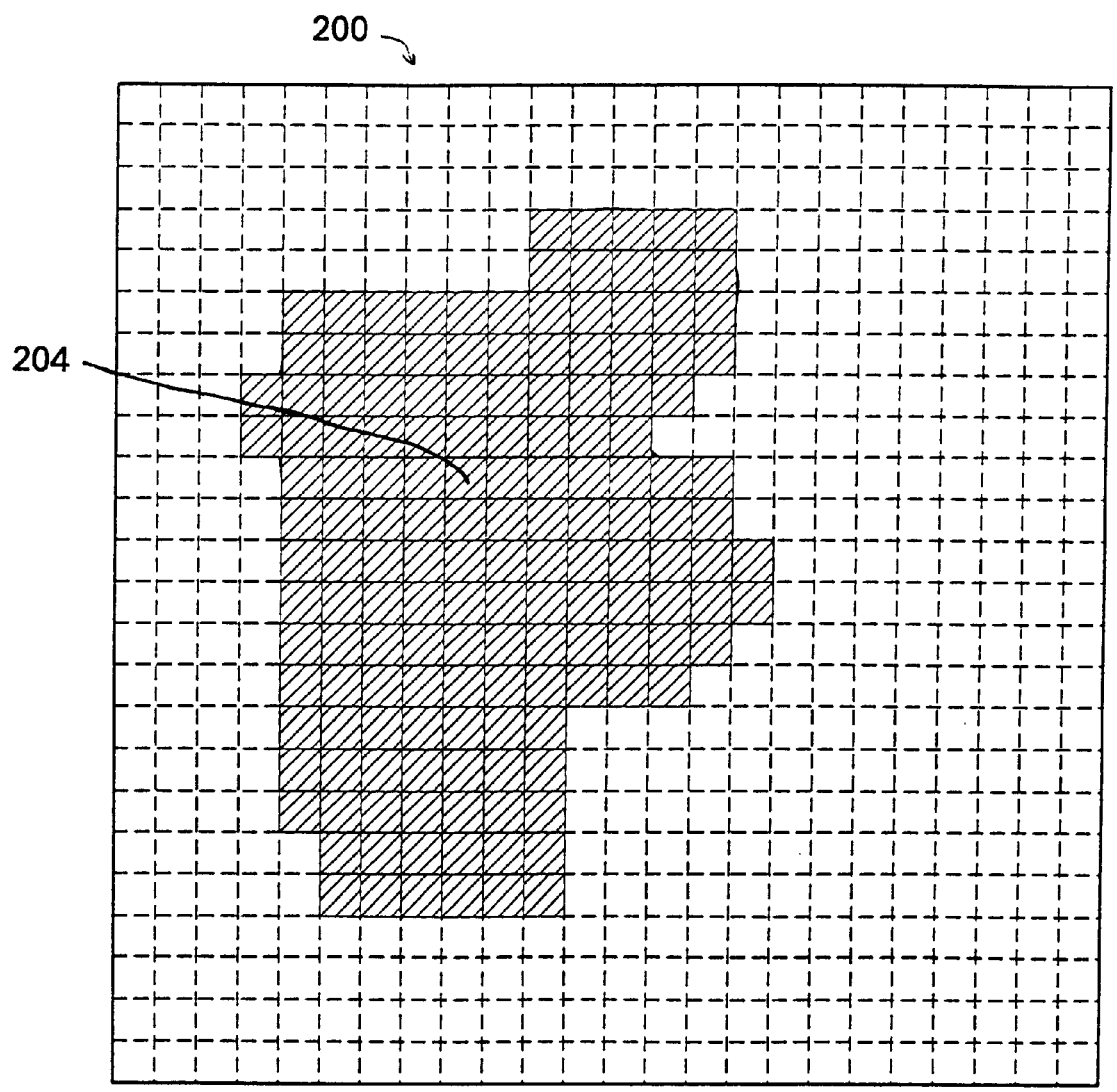

As shown in FIG. 6, connectivity mechanism 124 has completed the marking of the pixels with the body material of this example by performing another forward marking process step, advancing through the pixels from top to bottom and from left to right. As before, connectivity mechanism 124 (FIG. 1) has continued to advance to the next forward pixel and to mark the pixel as a seed as long as the pixel is within the body material and has a direct neighbor that is a seed. While not further described, since new seed pixels were identified in the second forward marking process step, connectivity mechanism 124 would perform another backward marking process step. However, since all pixels in the body material of interest have been marked, no new seed pixels would be marked during the second backward marking process step and the image processing would be completed.

Figure 7:
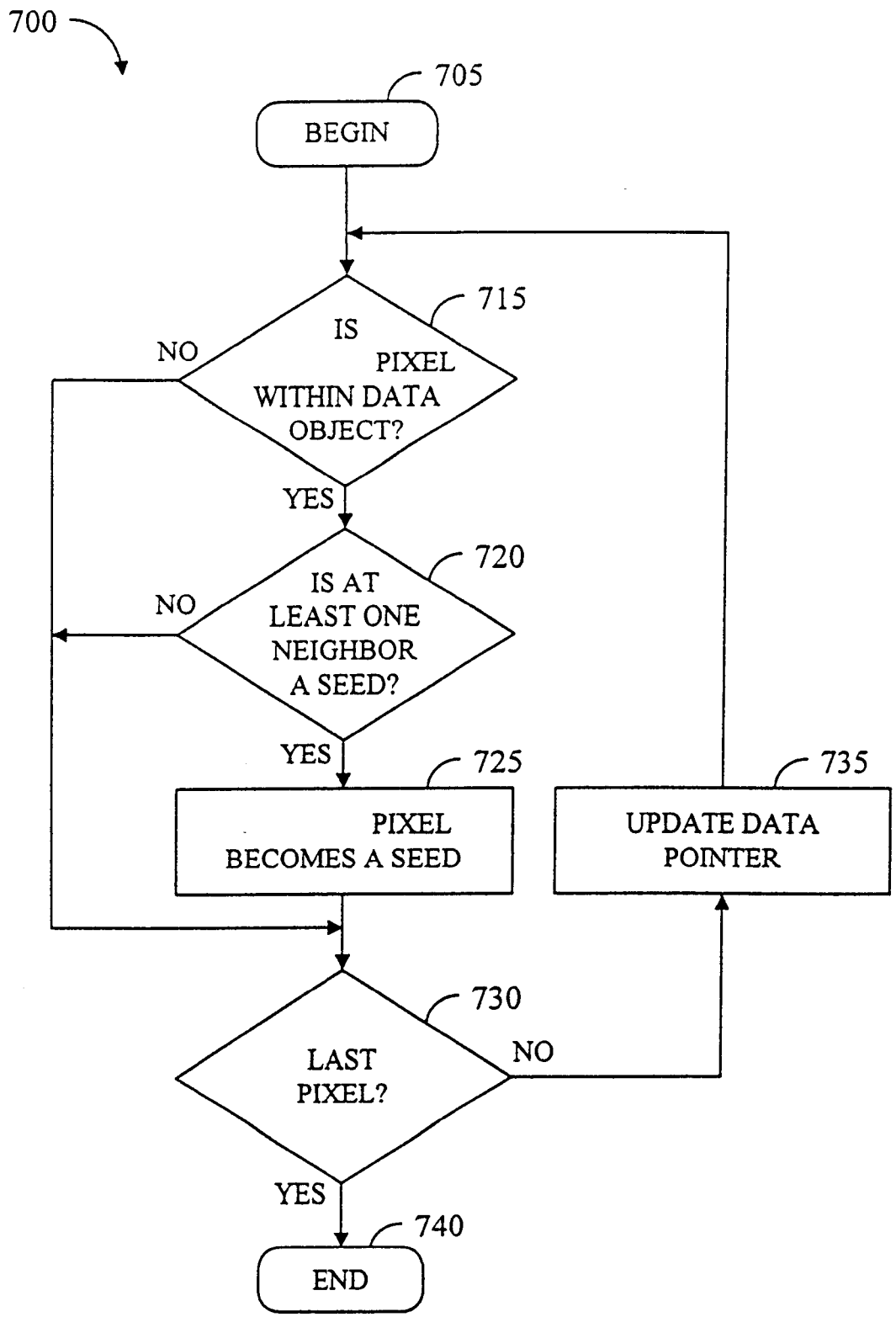
FIG. 7 is a flow chart depicting the process steps utilized by a connectivity mechanism in accordance with a preferred embodiment of the invention.

FIG. 7 illustrates a method 700 for performing a forward or backward marking process step for imaging connectivity of tomography images in accordance with a preferred embodiment of the invention. Method 700 begins at step 705 and, at step 715, determines at the upper-left most corner of the image, whether a data pointer, pointing to the selected pixel, is within the object data. The data pointer associated with the pixel under consideration keeps track of which pixel the connectivity mechanism is currently evaluating. The object data corresponds to the body material that the operator has chosen to examine. As discussed above, each pixel that represents body material of interest has a value of one. All pixels not designated as body material of interest will have a value of zero. Thus, when the connectivity mechanism determines whether the data pointer is within the object data, for purposes of the present example, the connectivity mechanism is determining whether the pixel identified by the data pointer has a value of one.

If the connectivity mechanism determines that the data pointer is not associated with a pixel within the object of interest (step 715=NO), the value of the pixel under examination is zero. In that circumstance, the connectivity mechanism determines, at step 730, whether or not this pixel is the last pixel in the image to be processed. If this pixel is the last pixel in the image to be processed (step 730=YES), the forward or backward marking process step terminates (step 740). On the other hand, if additional pixels remain in the image to be processed, the data pointer is updated at step 735 to process the next pixel, and the process returns to step 715.

At step 715, if the data pointer is associated with a pixel that is within the object of interest (step 715=YES), the connectivity mechanism determines, at step 720, whether or not at least one direct neighbor of the pixel referenced by the data pointer is a seed. As previously discussed, each pixel in a two dimensional data set has eight neighbors, four of which are direct neighbors. Each seed pixel in the data set has a numeric value of two. Thus, for purposes of the present example, when the connectivity mechanism determines whether at least one direct neighbor of the pixel referenced by the data pointer is a seed pixel, the mechanism is determining whether any direct neighbor pixel of the current pixel has the numeric value of two associated with it.

If the connectivity mechanism determines that the pixel is within the object data but does not have at least one direct neighbor that is a seed pixel (step 720=NO), the connectivity mechanism proceeds to step 730 as discussed above. If, on the other hand, the connectivity mechanism determines that at least one direct neighbor of the pixel currently referenced by the data pointer is a seed pixel (step 720=YES), the connectivity mechanism marks the pixel currently referenced by the data pointer as a seed pixel (step 725) and advances to step 730. The pixel thus marked as a seed pixel is assigned the value of two by the connectivity mechanism. If desired, other numeric values can be used to designate pixels as seed pixels.

When the connectivity mechanism has marked a pixel as a seed pixel (step 725), the mechanism proceeds to step 730 to determine whether or not the pixel thus marked is the last pixel in the image to be processed. As before, if the marked pixel is the last pixel in the image to be processed (step 730=YES), the forward or backward marking process will end (step 740). On the other hand, if the marked pixel is not the last pixel in the image to be processed (step 730=NO), the connectivity mechanism updates the data pointer at step 735 and returns to step 715, iteratively processing all pixels in the image in similar fashion.

As discussed above, the connectivity mechanism first examines all forward pixels in the object data. When all forward pixels within the object have been marked, the mechanism examines all of the backward pixels in the object data. Therefore, the direction in which the data pointer will be updated depends on whether the connectivity mechanism is examining the forward pixels or the backward pixels.

Figure 8:
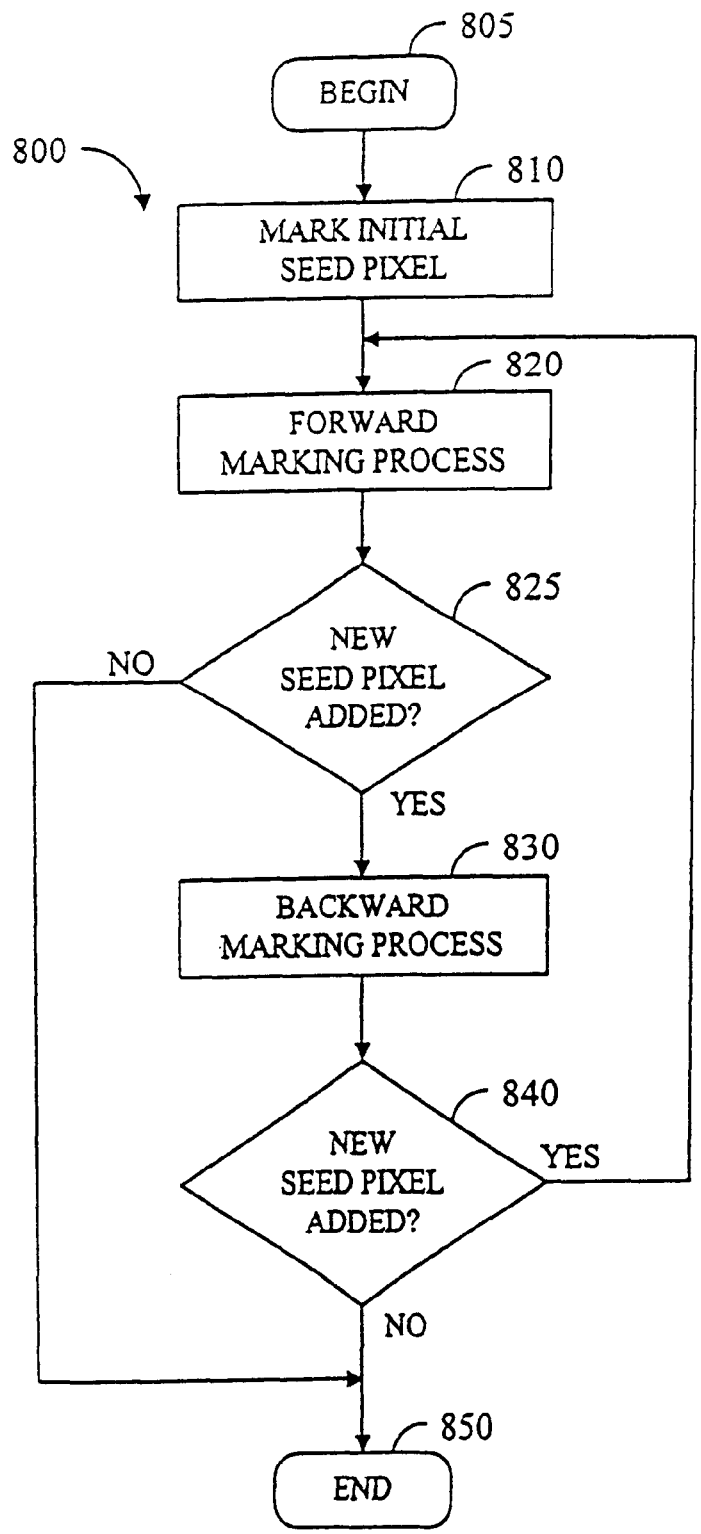
FIG. 8 is a flowchart depicting a method for marking a tomography image according to a preferred embodiment of the present invention.

FIG. 8 illustrates a method 800 for marking a tomography image for connectivity processing according to a preferred embodiment of the invention. Method 800 begins when a tomography image is to be marked for imaging purposes (step 505). At step 710, the operator initially marks the first seed within the area of interest for the image. Next, at step 820, the connectivity mechanism performs a first forward marking process step as described above in conjunction with FIG. 7. After the forward marking process step, the connectivity mechanism determines, at step 825, whether or not any pixels were identified or added as new seed pixels during the forward marking process step. If any new seed pixels have been added, (step 825=YES), the process continues to step 830 for further processing. Alternatively, if no new seed pixels were added during the forward marking process step (step 825=NO), the process ends (step 850).

If any new seed pixels were added during the forward marking process (step 825=YES), then at step 830 the connectivity mechanism performs a backward marking process step as described above in conjunction with FIG. 7. The connectivity mechanism then determines, at step 840, whether or not any pixels were identified and added as new seed pixels during the backward marking process step. If any new seed pixels were added, (step 840=YES), the process returns to step 810 for further processing and continues in this fashion until all possible seed pixels have been marked. Alternatively, if no new seed pixels are found during the backward marking process, then no new seed pixels are added (step 840=NO) and the process ends (step 850).

The detection of new seed pixels during a forward marking process step or a backward marking process step can be accomplished by various techniques. For example, a flag or a memory location can be used as a "new seed pixel flag." In this example, the connectivity mechanism would initially set the value of the new seed pixel flag to "0" at step 805. Then, during processing, the connectivity mechanism would set the value of the seed pixel flag to "1" if a new seed pixel is identified at either step 820 or step 830. At steps 825 and

840, the connectivity mechanism would check the seed pixel flag for a value of "1" and reset the flag to "0" before moving to steps 820 or 830, respectively. Those skilled in the art will recognize that many other suitable techniques may be employed to detect the addition of new seed pixels.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method for connectivity processing of a tomographic image containing a plurality of pixels within a body material of interest, comprising the steps of:

(a) identifying one of the plurality of pixels within the body material of interest as a seed pixel; and (b) evaluating each of the plurality of pixels within the body material of interest, in turn, by performing a forward marking process step and identifying a second one of the plurality of pixels as a new seed pixel if said second one of the plurality of pixels is a direct neighboring pixel to said seed pixel; and further performing the forward marking process step and identifying a third one of the plurality of pixels as a new seed pixel if one of the plurality of pixels is a direct neighboring pixel to said new seed pixel;

(c) iteratively repeating the steps of step (b) until none of the plurality of pixels is identified as a new seed pixel during step (b);

(d) identifying one of the plurality of pixels within the body material of interest as a backward marking seed pixel;

(e) evaluating each of the plurality of pixels within the body material of interest, in turn, by performing a backward marking process step and identifying a new seed pixel in the backward marking process step if one of the plurality of pixels is a direct neighboring pixel to the backward marking seed pixel, and further performing the backward marking process step and identifying a plurality of new seed pixels in the backward marking process; and, (f) iteratively repeating steps of step (e) until none of the plurality of pixels is identified as a new seed pixel in the backward marking process during step (e).

2. The method of claim 1 wherein the step of identifying a second one of the plurality of pixels as a new seed pixel comprises the step of changing a numeric value associated with the second one of the plurality of pixels from a first number to a second number.

3. The method of claim 1 wherein the step of identifying a third one of the plurality of pixels as a new seed pixel comprises the step of changing a numeric value associated with the third one of the plurality of pixels from a first number to a second number.

4. The method of claim 1 wherein the step of performing a forward marking process step comprises:

associating a data pointer with one of the plurality of pixels in turn, beginning with a pixel which is located in an upper-leftmost portion of the tomographic image; and evaluating each of the plurality of pixels in turn, in a top-to-bottom, left-to-right fashion by sequentially associating the data pointer with each of the plurality of pixels.

5. The method of claim 1 wherein the step of performing a backward marking process step comprises:

associating a data pointer with one of the plurality of pixels in turn, beginning with a pixel which is located in a lower-rightmost portion of the tomographic image; and evaluating each of the plurality of pixels, in a boftom-to-top, right-to-left fashion by sequentially associating the data pointer with each of the plurality of pixels in turn.

6. A method for processing a tomographic image containing a plurality of pixels, a portion of the plurality of pixels representing at least one body material of interest, each respective one of the plurality of pixels being assigned either a first numeric value or a second numeric value, comprising the steps of:

(a) marking one of the portion of the plurality of pixels representing at least one body material of interest as a seed pixel by changing the numeric value associated with the seed pixel to a third numeric value;

(b) evaluating a next pixel from the plurality of pixels, said next pixel being a direct neighboring pixel to said seed pixel;

(c) changing the numeric value of the next pixel to the third numeric value, thereby designating the next pixel as an additional seed pixel if the numeric value of said next pixel is the second numeric value; and (d) repeating steps (b) and (c) for each of the plurality of pixels, beginning at an upper left-most corner of the image and evaluating the plurality of pixels in a left-to-right, top-to-bottom fashion;

(e) repeating step (c), beginning at a lower right-most corner of the image and evaluating the plurality of pixels in a right-to-left, bottom-to-top fashion.

7. The method of claim 6 wherein the first numeric value is zero, the second numeric value is one and the third numeric value is two.

8. The method of claim 6 further comprising repeating steps (b), (c) and (d) until no pixels of the plurality of pixels are marked as additional seed pixels.

9. The method of claim 6 wherein the step of evaluating a next pixel from the plurality of pixels comprises the step of associating a data pointer with said next pixel.

10. A connectivity processing program product comprising:

a connectivity mechanism for iteratively marking a tomographic image by performing at least one forward marking process step and marking at least a first one of a plurality of pixels as a new seed pixel if said first one of the plurality of pixels is contained within a body material of interest and has at least one direct neighbor pixel which is a seed pixel and wherein the connectivity mechanism is further adapted to perform at least one backward marking process step and to mark at least a second one of the plurality of pixels as a new seed pixel if said second one of the plurality of pixels is contained within said body material of interest and has at least one direct neighbor pixel which is a seed pixel, if at least said first one of the plurality of pixels is marked as a new seed pixel during the forward marking process step, and wherein the connectivity mechanism is adapted to iteratively repeat the forward marking process and the backward marking process steps; and a signal bearing medium containing said connectivity mechanism.

11. The connectivity processing program product of claim 10 wherein the signal bearing medium comprises one of the group consisting of transmission media and recordable media.

* * * * *

UNITED STATES PATENT AND TRADEMARK OFFICE
CERTIFICATE OF CORRECTION

PATENT NO. : 6,463,168 B1
DATED : October 8, 2002
INVENTOR(S) : Abdalmajeid Musa Alyassin, Gopal Biligeri Avinash and William Edward Lorensen It is certified that error appears in the above-identified patent and that said Letters Patent is hereby corrected as shown below:

<u>Title page,</u>
Item [75], Inventors, correct spelling of second inventor's name is -- Gopal Biligeri Avinash --

Signed and Sealed this

Twenty-fifth Day of May, 2004

JON W. DUDAS
*Acting Director of the United States Patent and Trademark Office*